Aug. 1, 1933.  L. E. ADLER  1,920,456
TRANSMISSION TESTING APPARATUS
Filed June 29, 1931   2 Sheets-Sheet 1
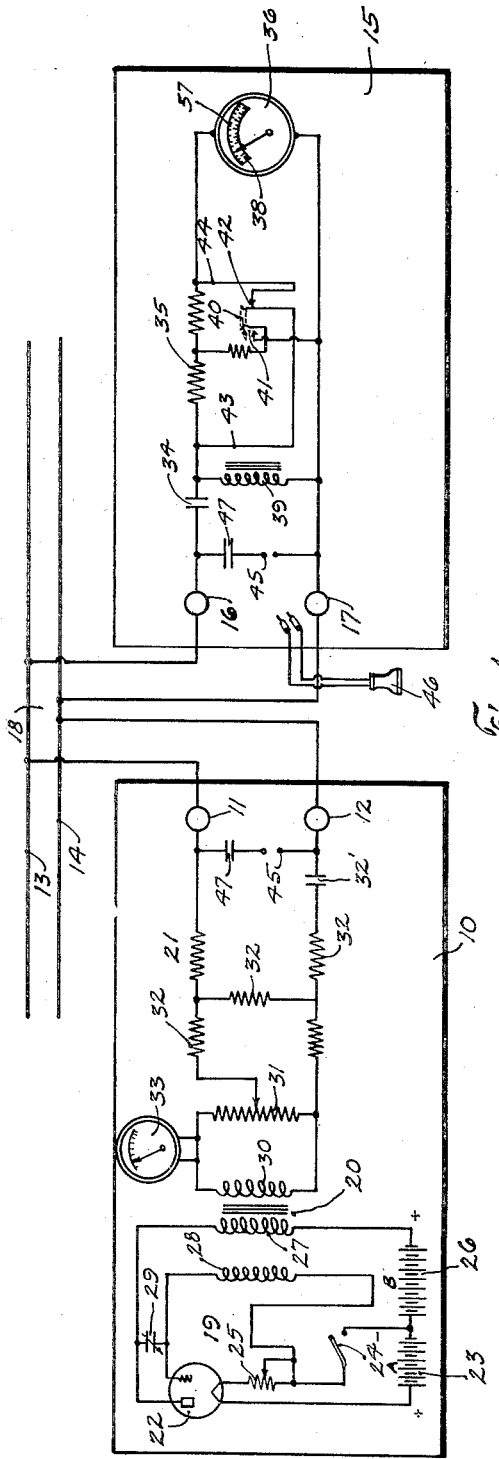
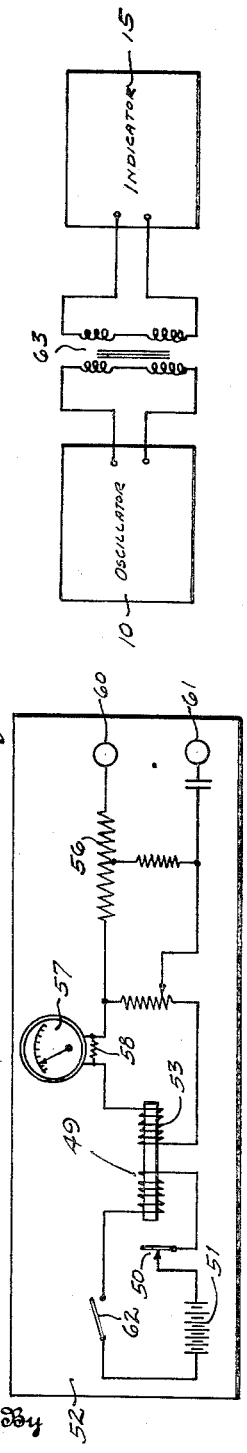
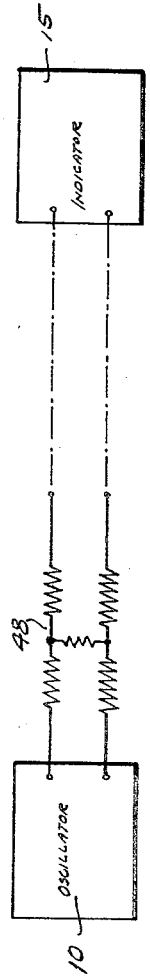
Inventor
Lee E. Adler
By Jack A. Ashley
Attorney Aug. 1, 1933.                L. E. ADLER                1,920,456
TRANSMISSION TESTING APPARATUS
Filed June 29, 1931                2 Sheets-Sheet 2
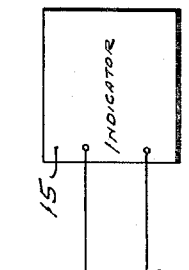
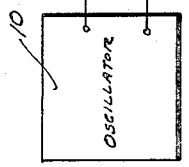
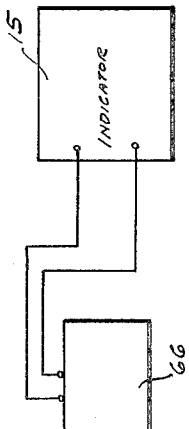
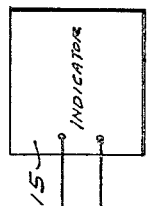
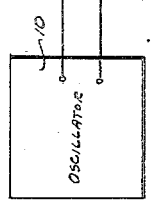
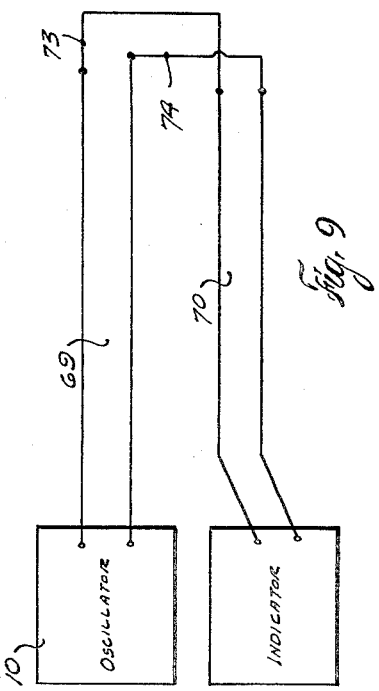
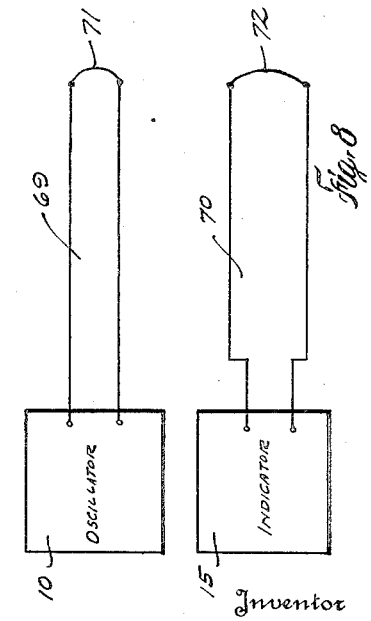
Inventor
Lee E. Adler
By Jack A. Schley
Attorney Patented Aug. 1, 1933

1,920,456

UNITED STATES PATENT OFFICE 1,920,456

TRANSMISSION TESTING APPARATUS

Lee E. Adler, Dallas, Tex.

Application June 29, 1931. Serial No. 547,650

12 Claims. (Cl. 179—175.3)

This invention relates to testing sets for measuring voice transmission efficiency of the telephone lines, broadcasting lines, the efficiency of apparatus associated therewith and other circuits.

Generally, the object of the invention is to provide testing sets comprising two light and compact portable units, an oscillator unit and an indicator unit, each in its separate carrying case or box whereby the sets will be serviceable in field tests. The oscillator unit has the function to transmit an alternating current of predetermined amount into the lines or equipment which are subjected to the test measurements at an average frequency of speech current, 1000 cycles or over a range of frequencies as desired. The indicator unit has the function to measure the proportionate amount of the current transmitted from the oscillator unit which is received by the indicator and to indicate the amount of said current directly on a scale calibrated in units of current or preferably in accordance with this invention to indicate the proportionate amount of said current on a scale calibrated in decibels to show directly the efficiency of the line or equipment in terms of telephone transmission units so that the usual calculations to determine these measurements will be unnecessary. With these units the sets are ready for immediate use requiring no accessories, complicated preliminary balancing or outside power.

Another object is to provide the testing sets with rugged but sensitive types of rectifying meters requiring small battery power in the oscillating unit only and which will have greater sensitiveness and require very much less power than thermo-couple type sets and are therefore more economical as well as more serviceable than such sets which require vacuum tube amplification in both transmitting and receiving ends.

A further object is to provide for changing the scale range of the meter in the indicator unit, this meter for example being calibrated for reading in transmission units from 0 to 15 decibels, by cutting out a pad of a known transmission efficiency,—a 10 decibel pad cut out would increase the range to 25 decibels for measuring transmission losses greater than 15 decibels, or in case of gains in transmission lines by insertion of pads of known transmission equivalents.

Further features, objects and details of the invention will appear in the following specification in conjunction with the accompanying drawings in which,—

Figure 1 is a diagram showing a transmitting oscillator and receiving indicator with a line connected between them to be tested.

Figure 2 is a diagram of a modified form of transmitting oscillator unit.

Figure 3 is a diagram showing an artificial line or pad inserted as a multiplier to produce an effective line transmission loss or to increase the loss range of the arrangement as shown in Figure 1.

Figure 4 is a diagram showing the oscillator and indicator units in use for measuring losses (or gains) in instruments, such as a repeating coil.

Figures 5 to 9 inclusive are similar diagrams showing other applications of units in measuring telephone receivers and transmitters, series loss, parallel or bridged loss, cross talk and loop attenuation measurements respectively.

Referring to the drawings, in Figure 1 a vacuum tube type of oscillating unit arranged in a portable form in a case designated 10 is shown with its terminal members 11 and 12 connected with wires 13 and 14 of telephone transmission lines or the like at a point along the lines or at a central station from which a test is to be made. At another point along the line wires 13 and 14, which may be at a distant central station or a subscriber's station, a receiving or indicating unit which is similarly housed in a portable case 15 has its terminals 16 and 17 connected with said line wires. The section of the transmission lines 18 which may contain various transmission line accessories, such as amplifiers, etc. is thus connected with the oscillator unit and indicator unit subject to being tested for transmission losses, or gains, as the case may be.

The oscillator unit, includes an oscillating circuit 19 the output of which feeds through a transformer 20 to the oscillator output circuit 21 for supplying an alternating current of audio frequency to the transmission lines, or apparatus, to be tested.

Oscillating circuit 19 includes a three electrode vacuum tube 22 which receives its energy from an A battery 23 which is controlled by a key type switch 24 and is adjusted by a rheostat 25. The plate circuit of oscillator tube 22 is supplied with current from a B battery 26, the negative terminal of which is connected with the negative terminal of A battery 23 and from the positive terminal of B battery 26 the circuit includes the primary coil 27 of transformer 20 as the output of the oscillating circuit and from thence it is connected with the plate of tube 22. The grid circuit of oscillator tube 22 includes an inductance 28 which is connected between the grid of this tube and the common negative side of the A and B batteries. A condenser 29 coupling inductance 28 with the plate circuit is connected across the plate and grid circuits of oscillator tube 22 and may be varied to produce the desired frequency of the oscillator.

Oscillator output circuit 21 includes the secondary 30 of transformer 20 which feeds the alternating current produced by the oscillating circuit through a resistance 31 for adjusting the current output current to the lines or apparatus under test by changing the potential applied thereto. Then a "pad" or artificial line consisting of a combination of resistances 32 which may be exchanged so as to introduce losses of a varied number of transmission units or "decibels" as may be desired under certain tests is next connected in the output circuit. A condenser 32' is provided to protect the meter and other apparatus from damage by excessive current from outside sources. The output circuit is measured by an alternating current milliammeter 33 connected in this circuit between transformer 20 and resistance 31, referred to hereinbefore.

The receiving or indicating unit includes in its circuit connected with terminals 16 and 17 a condenser 34, a pad 35 and then a rectifier type of meter 36 which is calibrated with a "decibel" scale 37 and also a milli-ampere scale 38, the latter being provided in order that actual current values may be read by the indicator unit as well as the oscillator unit when desired.

The indicating unit also has a choke coil inductance 39 bridged across its circuit to effectively eliminate low frequency line noises which might otherwise interfere with the obtaining of accurate measurements, and thus no trouble should be experienced from such sources as long as the line under consideration is not so noisy as to be uncommercial. A key switch 40 is operable to connect pad 35 in or cut it out of the circuit. When the key switch member is thrown to the left contacts 41 are brought into engagement properly connecting the pad in the circuit, and when thrown to the right contacts 42 are brought into engagement connecting conductors 43 and 44 for short circuiting the series connected resistances of the pad in indicator circuit to extend the scale readings of the meter 36 to a maximum. Pin jacks 45 are also provided in the receiving or indicator unit to enable the tester or monitor to listen with a telephone receiver 46 for the cycle tone from the oscillator unit before attempting to obtain readings on meter 36. Such pin jacks are also provided in the oscillator unit and these jacks are connected across the circuits with small condensers 47 in series with them.

In practice these oscillating and indicating units are self contained portable sets, the casings containing the equipment above set forth, and the oscillating unit having space therein for the A and B batteries. The A battery consists of two 4.5 volt block type dry cell batteries connected in parallel and the B battery consists of two 22½ volt dry cell batteries connected in series. The plate circuit of the oscillator tube uses 22½ volts and an amplifier tube and circuit (not shown), coupled with the oscillator through a small condenser, uses the 45 volts of the B battery and the vacuum tubes employed are of a type having low voltage and low current filaments. The use of large inductance in the plate circuit of the oscillator tube and a small coupling capacity minimizes any harmonics of the fundamental frequency of the oscillator in the output circuit of the amplifier. The frequency employed for tests is 1000 cycles, (however small variations from 800 to 1200 cycles may be used without perceptible error in the calibration of the indicator) and in field calibration of the oscillator a pitch pipe producing 1000 cycles may be employed when adjusting the frequency by listening in the telephone receiver 46 connected in the pin jacks 45 provided for that purpose. Milli-ammeter 33 in the output circuit of the oscillating unit is a rectifying type designed for a maximum output of about 5 m.a. into a circuit of 500 ohms.

In the receiving or indicating unit the milliammeter 36 is designed for reading transmission losses directly, without the use of amplifier circuits, tubes and batteries, and is calibrated in units of voice transmission reading up to 15 decibels directly at a frequency of 1000 cycles with the "pad" 35 "in" for measurements of this type, or on the mil-ampere scale in actual current values for other types of measurements for which the indicator unit may be employed. Pad 35 is the equivalent of 10 d.b. with a terminal impedance of 500 ohms, and by shifting the key of switch 40 from "in" position to "out" position the scale of meter 36 is extended to a maximum of 25 d.b.

In order to make attenuation measurements on voice frequency telephone circuits and apparatus the oscillator unit is first adjusted to the desired frequency (1000 cycles) as follows: Key switch 24 is closed and rheostat 25 adjusted so that the proper filament current is obtained in the tube 22 (and amplifier tube) and then by aid of the telephone receiver connected with pin jacks 45, in the oscillator unit, the tone of the oscillations is determined and adjusted to the required frequency according to the frequency of the pitch pipe or the like. Fine adjustment of the frequency is provided by varying the capacity of condenser 29 and also by varying the filament current by rheostat 25. When the oscillator unit has been adjusted the receiving or indicating unit terminals 16 and 17 are connected direct to terminals 11 and 12 of the oscillator unit and with the key of switch 40 to pad "in" position resistance 31 of the oscillator unit is adjusted until meter 36 of the indicating unit reads 0 d.b. With these adjustments made the reading of meter 33 is noted and the two units are ready for field tests.

The instruments are then ready to set up at different points along the transmission line for making measurements of the section of line therebetween. With the units so connected (as shown in Figure 1) the oscillator is adjusted so as to transmit into the line the alternating current at the predetermined quantity, the exact reading of meter 33 previously noted, and the frequency employed for the measurements, 1000 cycles; at the indicator unit by means of a telephone receiver, 46, plugged into pin jacks 45 of the indicator it can be ascertained whether or not the oscillator tone is being received, and with the key of switch 40 turned to pad "in" position meter 36 should deflect, reading the loss in the line (or apparatus) directly in decibels, unless the loss is greater than the 15 d.b. capacity of the scale reading. If the loss is greater than 15 d. b., by turning the key of switch 40 to pad "out" position the range of the indicator is increased to 25 d.b. and the loss of the line (or apparatus) will be the reading of the meter 36 plus 10 d.b., the loss pad 35.

In portable testing sets for measuring transmission efficiency of telephone lines as constructed for field service the oscillator unit is equipped for measuring transmission lines and the like having normal characteristics and the best results for example will be obtained when measuring lines or apparatuses whose impedance at 1000 cycles is approximately 500 to 600 ohms—the value more generally found in open-wire circuits and equipment. However, correct results will be obtained with lines and apparatus of other impedances, if the input impedance of the receiving unit is "built out" to the same impedance as the line or apparatus. That is, if the circuit impedance is greater than 800 ohms, and has an impedance of R ohms, a resistance whose value is 600 ohms should be connected in series with one of the input terminals of the receiving unit and the line. In Figure 3 a pad 48 is shown connected in the circuit for this purpose. This pad may be a 10 decibel or other value of artificial line unit, as an accessory, for use as a multiplier to increase the lost range of the combination. This pad 48 also functions in the combination to provide a loss operating to negative any gain which may occur in a transmission line or apparatus due to amplification or the like whereby the indicator unit meter 36 will be capable of reading such gains in efficiency directly in transmission units, the reading indicating a net loss being the difference between the gain in the line and the loss in pad 48 which would necessarily have to be a greater transmission equivalent.

It is frequently desirable, if not essential as in some localities where it is difficult to obtain the plate voltage batteries to provide a transmitting oscillator where such batteries are not required. Such an oscillator is diagrammatically shown in Figure 2 and consists of an extremely light, compact and rugged set for field service having a mechanical type oscillator 49 consisting of an induction coil with a reed type buzzer 50 tuned to vibrate at 1000 cycles per second,— or a microphone button type of buzzer or the like. This oscillator is supplied by two 4.5 volt dry cell batteries 51 connected in multiple which are placed in a compartment of the case 52 in which all of the oscillator unit apparatus is housed. The secondary coil 53 of the oscillator induction coil 49 feeds into a pad 56 having predetermined transmission equivalents of the character previously described. A meter 57 of the same general character as meter 33 described in connection with the tube type oscillator unit is connected in the output circuit. This meter is provided with a meter shunt 58 connected across its terminals. The unit has terminal members 60 and 61 similar to the members 11 and 12.

In operation the buzzer of induction coil 49 is set into motion upon closing key switch 62 so as to connect battery 51 with the induction coil and the frequency of the buzzer may be checked with a pitch pipe having a frequency of 1000 cycles as previously set forth. The terminals 60 and 61 are connected with terminals 16 and 17 of the indicator unit and the output of the oscillator is adjusted until the indicator meter reads "0" d.b. as previously set forth. The reading of meter 57 is noted and the sets are then ready for testing the transmission line or apparatus to be measured. The units are connected with the line as indicated in Figure 1 and the current is adjusted so that meter 57 will read exactly the same amount as when the indicator was connected directly therewith and is held at this value during the entire duration of the test. The indicator unit is operated in the same manner as previously set forth by listening with the head phone connected in pin jacks 45 for the oscillator tone and then reading the loss in the line or appartus in decibels on meter 36.

In Figure 4 the oscillator and indicator units are shown connected with a repeating coil 63 under test for transmission efficiency. In testing such equipment the operations are substantially the same as previously set forth in the testing of transmission lines in making attenuation measurements where the losses may be of considerable magnitude or on the other hand there may be an actual gain in efficiency. In the same manner measurements of other apparatuses, switch board circuits, such as cord circuits for transmission losses, the exact efficiency of transmitters and receivers as well as other functions may be measured with the oscillator and indicator sets in accordance with this invention.

In the testing of transmitters and receivers, one method is to connect a "standard" receiver 64 direct to the oscillator unit terminals, the receiver is placed tightly against the transmitter 65 to be tested as shown in Figure 5, and if the transmitter for example is connected through a "standard" magneto telephone circuit 66 or the like, to the indicator unit, the oscillator output will cause a deflection of the indicator from which the efficiency of the transmitter may be determined. Similarly by using a "standard" transmitter in the circuit and connecting a receiver to be tested in place of the "standard" receiver the efficiency of the receiver under test may be determined.

In the testing of the capacity of condensers with these oscillators and indicator units, the condensers may be connected either in series as shown in Figure 6, or in parallel as shown in Figure 7, for either series or parallel losses.

Condensers, resistances, inductances, and other apparatus to be tested are connected at 67, Figure 6, in series with the oscillator and indicator units. The apparatus shown 67, in this instance comprises simplex or phantom repeating coils for unbalanced windings. It is to be noted that in testing such coils, both halves of the primary should show the same readings as should also both halves of the secondary. The two primaries, however, may differ slightly from the secondaries without causing trouble.

Such apparatus, drops, relays, etc. are also tested as parallel being connected at 68, Figure 7, with the oscillator and indicator units to determine the amount of their loss when bridged across a talking circuit. As shown, an inductance coil, such as a relay winding, is shown connected at 68.

Referring to Figure 8, the oscillator and indicator units are shown connected with two transmission line circuits 69 and 70 respectively, in order to measure abnormal "cross-talk" between these two circuits, by noting the amount of oscillator current induced from line 69 to line 70. In this test the ends of the lines are connected with telephones or 600 ohm shorts 71 and 72 respectively. The efficiency of both of such a pair of transmission lines may be measured in a similar manner by substituting for the telephones or resistance shorts, conductors 73 and 74, tying the distant ends of the lines together as shown in Figure 9, thereby forming a loop and measuring the attenuation losses as previously set forth (providing their combined losses do not exceed 30 decibels, the maximum range of the indicator unit). If both lines have the same characteristics, the loss on each line is of course one-half that of the total loop. In this way parallel transmission lines of similar characteristics may be measured for transmitting efficiency both in line losses and cross-talk.

What is claimed as the invention and is desired to be secured by Letters Patent is:—

1. The method of measuring transmission efficiency of telephone lines and the like which consists in impressing an alternating current of a predetermined value through a pad multiplier corresponding to a number of transmission units in excess of the maximum transmission units gained by the line section under test to a point of the line from which measurements are to be made and simultaneously measuring the proportionate amount of said current received at another point of the line at the end of the section of line under test to indicate the difference between said pad multiplier and the transmission equivalents of the line circuit under test.

2. In transmission testing the method for measuring the efficiency of telephone transmission lines and the like including an oscillator unit having an artificial net work or pad in its output circuit for impressing on a transmission line or the like at one point an alternating current, and also including an indicator unit having a meter with a scale calibrated in decibels, and the oscillator unit having an output adjustable to a predetermined value of current so that when the indicator unit is connected directly with the oscillator unit transmitting the predetermined value of alternating current it will read zero decibels and when it is connected at a remote point of the transmission line or the like will receive a proportionate amount of said transmitter alternating current transmitted corresponding to the efficiency of the circuit between said points and give a scale reading directly in decibels, and including a second separate pad unit having a certain loss in transmission units adapted to be connected in the line under test between the oscillator and indicator unit to counteract any gain in transmission efficiency there may be in a line under test so that the line efficiency may be determined by the difference between the loss in the pad and the reading of the meter.

3. In transmission testing apparatus for measuring the efficiency of telephone transmission lines and the like, an oscillator unit including an audion tube oscillator circuit for generating an alternating current and means for varying the frequency thereof, a transformer having its primary connected with the output of said oscillator circuit and an output circuit for impressing oscillations upon the lines or apparatus under test connected with the secondary of said transformer including a rectifying type of alternating current measuring meter and a potentiometer connected across the transformer secondary, and a pad approximating the impedance of a normal section of line to be tested in said output circuit connected with the variable terminals of said potentiometer.

4. In transmission testing apparatus for measuring the efficiency of telephone transmission lines and the like, an oscillator unit including an audion tube oscillator circuit for generating an alternating current with means for regulating the frequency thereof a transformer having its primary connected with the output of said oscillator circuit and an output circuit for impressing oscillations upon the lines or apparatus under test connected with the secondary of said transformer including a rectifying type of alternating current measuring meter and a potentiometer for regulating the amount of current fed into the lines or apparatus under test, and plugging in means for connecting a telephone receiver or the like with said output circuit for determining the frequency in adjusting the oscillator to the desired frequency.

5. In transmission testing apparatus for measuring the efficiency of telephone transmission lines and the like, an oscillator unit including an oscillator for generating an alternating current consisting of an induction coil with a tuned vibrating circuit breaker, the secondary of which induction coil constitutes the oscillator output, a transformer having its primary connected with the output of said oscillator, and an output circuit for impressing oscillations upon the lines or apparatus under test connected with the secondary of said transformer.

6. In transmission testing apparatus for measuring the efficiency of telephone transmission lines and the like in which an alternating current of predetermined value is supplied into the lines to be tested, an encased indicating unit including a pad multiplier having a definite loss in transmission units through which alternating current from the line flows, a key type switch operable to connect said pad multiplier in the circuit or to exclude it therefrom, and a rectifying type of alternating current meter calibrated in decibels corresponding to the proportions of the alternating current supplied by the line under test in transmission units.

7. In transmission testing apparatus for measuring the efficiency of telephone transmission lines and the like, means for supplying an alternating current of predetermined value into the lines to be tested, an indicating unit including a pad multiplier having a definite loss in transmission units through which alternating current from the line flows, a rectifying type of alternating current meter calibrated in decibels corresponding to the proportions of the alternating current supplied to the line so as to give direct readings of the efficiency of the lines under test in transmission units, and plugging in means for connecting a telephone receiver or the like with said indicator circuit so as to audibly determine whether the testing alternating current impulses are being received by the indicator unit.

8. In transmission testing apparatus for measuring the efficiency of telephone transmission lines and the like, means for supplying an alternating current of predetermined value into the lines to be tested, an indicating unit including a pad multiplier having a definite loss in transmission units through which alternating current from the line flows, a key type switch operable to connect said pad multiplier in the circuit or to exclude it therefrom, and a rectifying type of alternating current meter calibrated in decibels corresponding to the proportions of the alternating current supplied to the line so as to give direct readings of the efficiency of the lines under test in transmission units and also calibrated directly in current values.

9. In transmission testing apparatus for measuring the efficiency of telephone transmission lines and the like, means for supplying an alternating current of predetermined value into the lines to be tested, an indicating unit including a pad multiplier having a definite loss in transmission units through which alternating current from the line flows, a rectifying type of alternating current meter calibrated in decibels corresponding to the proportions of the alternating current supplied by the line and a manually operated switch associated with said pad operable to connect the pad in the circuit to provide for the direct scale readings of transmission units and operable to exclude the pad whereby the transmission loss of the pad will be added to the reading of the meter to thereby extend the loss range of the indicator unit.

10. In transmission testing apparatus for measuring the efficiency of telephone transmission lines and the like, means for supplying an alternating current of predetermined value into the lines to be tested, an indicating unit including a pad multiplier having a definite loss in transmission units through which alternating current from the line flows, a rectifying type of alternating current meter calibrated in decibels corresponding to the proportions of the alternating current supplied to the line so as to give direct readings of the efficiency of the lines under test in transmission units, and a choke coil inductance connected with the leads of said indicator unit for absorbing undesired oscillations or line disturbances at other frequencies than the frequency of the test alternating current supplied to the line so that the meter readings will be unaffected thereby.

11. The method of measuring pairs of transmission lines for cross-talk and loop attenuation losses which consists in impressing on one of the lines an attenuating current of a predetermined value and noting the amount of current induced in the other line and the proportionate amount received in said other line when the distant ends of the pairs of lines are directly connected to form a loop.

12. The method of measuring losses in apparatus or the like bridged across transmission circuits, which consists in impressing an attenuating current of a predetermined value on a receiving indicator connected therewith, bridging the apparatus across the connections with the receiving indicator and then noting the proportionate amount of said current received by the receiving indicator.

LEE E. ADLER.